US010743560B2

United States Patent
Berckmans et al.

(10) Patent No.: US 10,743,560 B2
(45) Date of Patent: Aug. 18, 2020

(54) COLD WATER-SWELLING, INTACT, HIGH AMYLOSE STARCH GRANULES

(71) Applicant: Cargill, Incorporated, Wayzata, MN (US)

(72) Inventors: Marc Berckmans, Brussels (BE); Jozef Victor Jean Marie Coppin, Denderleeuw (BE); Stephane Jules Jerome Debon, Saint-Gilles (BE)

(73) Assignee: CARGILL, INCORPORATED, Wazyata, MN (US)

( * ) Notice: Subject to any disclaimer, the term of this patent is extended or adjusted under 35 U.S.C. 154(b) by 32 days.

(21) Appl. No.: 16/243,375

(22) Filed: Jan. 9, 2019

(65) Prior Publication Data

US 2019/0166871 A1 Jun. 6, 2019

Related U.S. Application Data

(62) Division of application No. 14/349,928, filed as application No. PCT/EP2012/069042 on Sep. 27, 2012, now Pat. No. 10,219,525.

(30) Foreign Application Priority Data

Oct. 5, 2011 (EP) .................................... 11184039

(51) Int. Cl.
| | |
|---|---|
| *A23G 3/42* | (2006.01) |
| *A23P 10/20* | (2016.01) |
| *A23L 29/212* | (2016.01) |
| *C08B 30/14* | (2006.01) |
| *C08B 30/12* | (2006.01) |

(52) U.S. Cl.
CPC .............. *A23G 3/42* (2013.01); *A23L 29/212* (2016.08); *A23P 10/20* (2016.08); *C08B 30/14* (2013.01); *C08B 30/12* (2013.01)

(58) Field of Classification Search
CPC ......... A23G 3/42; A23L 29/212; A23P 10/20; C08B 30/12; C08B 30/14

USPC .......................................................... 426/661
See application file for complete search history.

(56) References Cited

U.S. PATENT DOCUMENTS

| 3,399,081 A | 8/1968 | Raffaele et al. |
| 5,057,157 A | 10/1991 | Jane et al. |
| 5,262,191 A | 11/1993 | Bishop et al. |

FOREIGN PATENT DOCUMENTS

| EP | 0032296 A2 | 7/1981 |
| EP | 0390960 A1 | 10/1990 |
| WO | 2009013346 A1 | 1/2009 |
| WO | 2011124656 A1 | 10/2011 |
| WO | 2013050286 A1 | 4/2013 |

OTHER PUBLICATIONS

Phillips, G. O., et al., Handbook of Hydrocolloids: Starch—pp. 41-45; Woodhead Publishing, 2000.

*Primary Examiner* — Jyoti Chawla

(57) ABSTRACT

A process for modifying starches comprises atomising an aqueous slurry of a non-pregelatmised, granular, high amylose starch into an internal chamber in a bi-fluid nozzle of a dryer and treating the atomized slurry, in the internal chamber, with medium pressure steam to produce a slurry of partially treated starch granules followed by discharging the slurry into a reactor where it is contacted with superheated steam to produce dry, particulate, cold water-swelling, intact, high amylose starch granules. The cold water-swelling, intact, high amylose starch granules have greater than 15% solubles. At a starch concentration of 1%, in UDMSO (9 volumes DMSO and 1 volume 6M urea) at 25° C., the ratio of apparent viscosity of said cold water-swelling, intact, high amylose starch granules to the apparent viscosity of the parent non-pregelatinised, granular, high amylose starch is lower than 1.00. The cold water-swelling, high amylose granular starch of the invention is useful in the manufacture of food products, especially confectionery products and convenience food products.

5 Claims, 4 Drawing Sheets

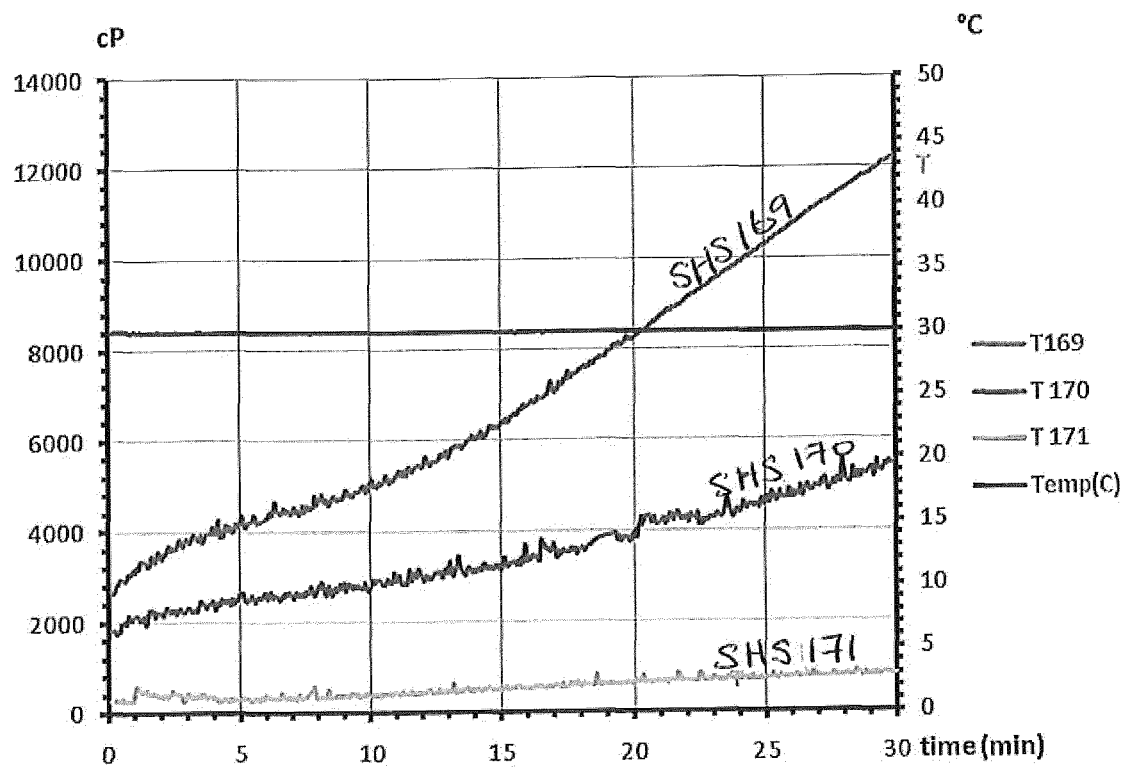
FIG.2: Cold (30°C) RVA viscosity of starches of the invention

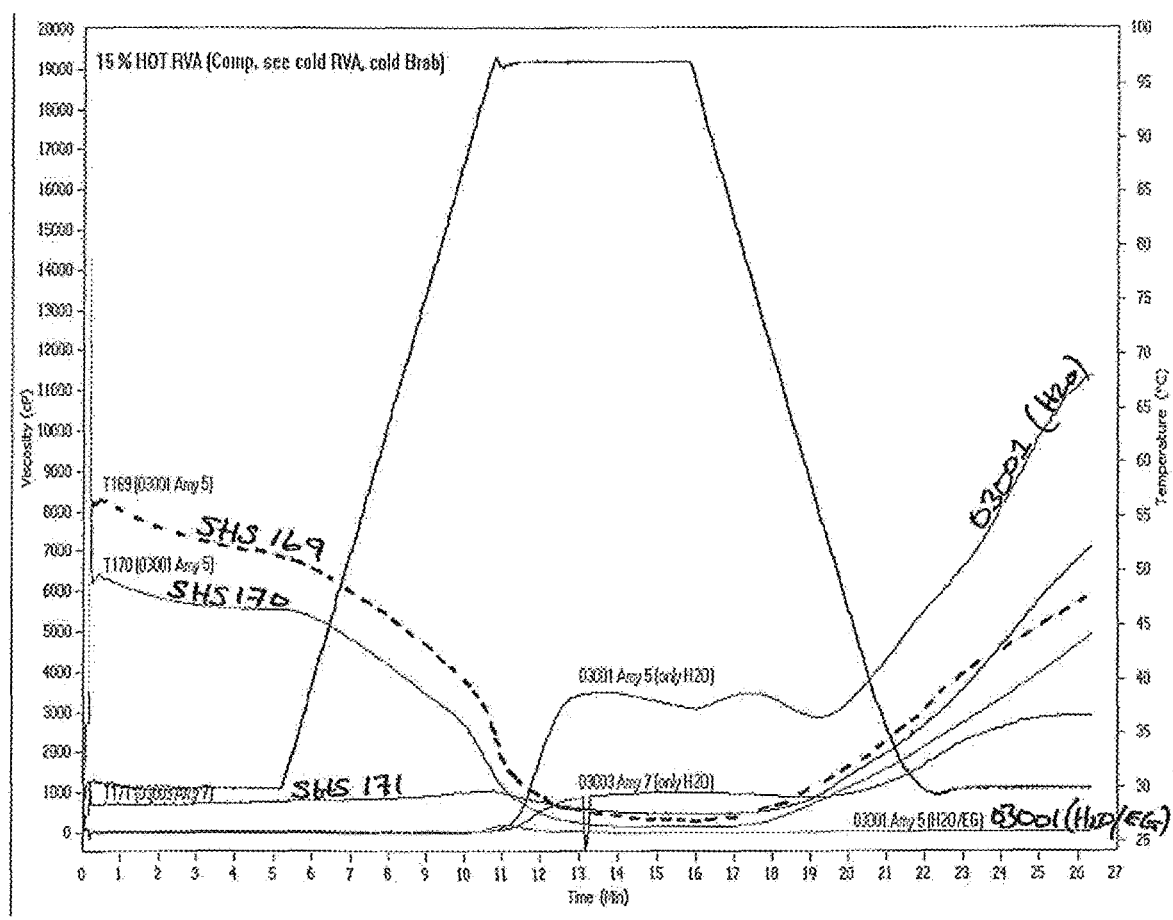
FIG.3: Sequential cold (30°C)-hot (95°C)-cold (30°C) RVA

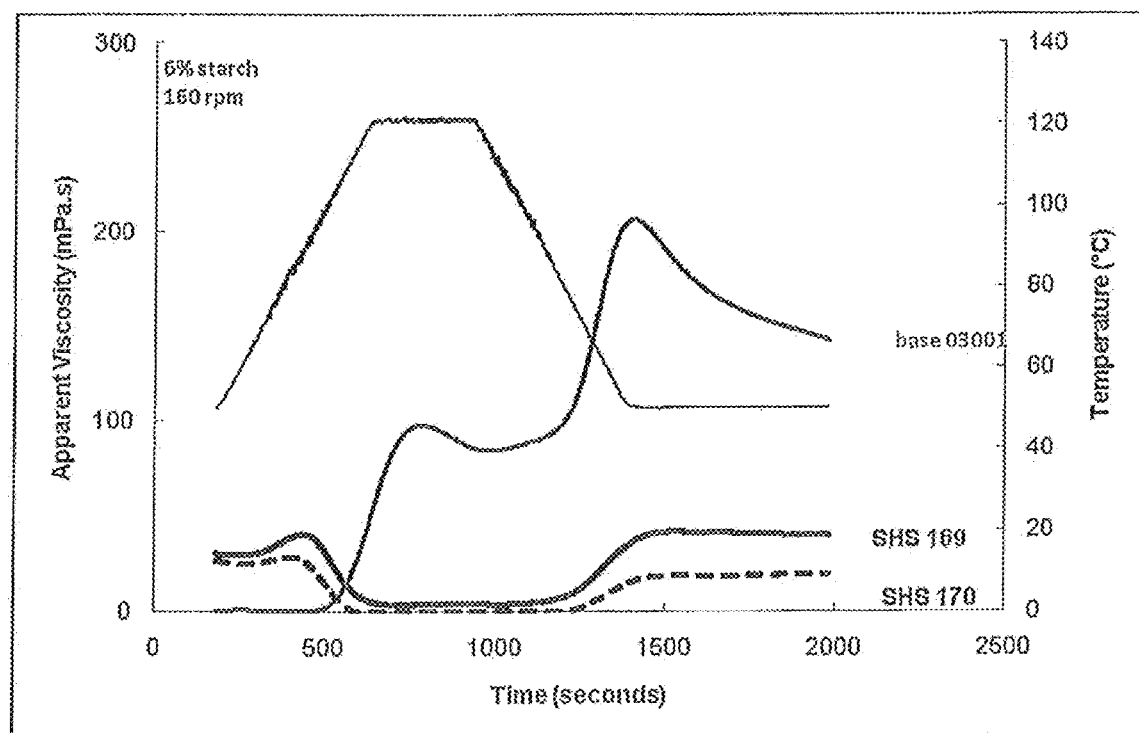
FIG. 4A : Retorting (121°C) – T169 T170
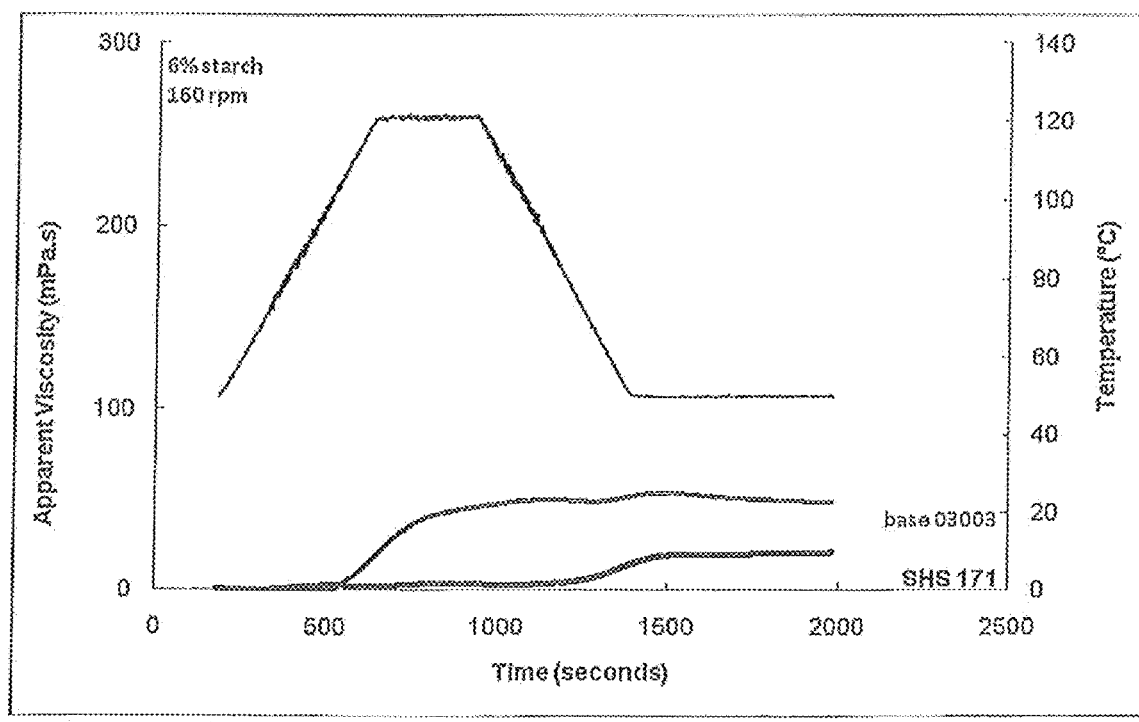
FIG. 4B : Retorting (121°C) – T171

COLD WATER-SWELLING, INTACT, HIGH AMYLOSE STARCH GRANULES

TECHNICAL FIELD

The present invention relates to a process for modifying starches by subjecting a non-pregelatinised, granular, high amylose starch to a superheated steam treatment. In particular, it relates to a process for manufacturing cold water-swelling, intact, high amylose starch granules, to the cold water-swelling, intact, high amylose starch granules and to their use in the manufacture of food products, especially confectionery products and convenience food products.

BACKGROUND OF THE INVENTION

When a starch has been pre-cooked, it can be used to thicken cold foods. Such a starch is referred to as a pregelatinised or instant starch. Otherwise, starch requires heat to cause it to thicken or "gelatinise". The actual temperature required to gelatinise starch in an excess of water depends on the type of starch. Pregelatinised starches are particularly widely used in convenience foods such as instant soups, instant sauces, instant gravies, instant beverages, salad dressing mixes and the like, in dairy foods, such as instant puddings and the like, in bakery foods, such as cake mixes, bakery creams and the like, and in instant baby and infant foods.

The terms "gelatinised" or "cooked" starch refers to swollen granules which have lost their polarisation crosses and which may or may not have lost their granular structure. The term "partially gelatinised" starch refers to partially swollen granules which have not yet completely lost their polarisation crosses or their granular structure. The thermal processes generally employed to prepare pregelatinised starches include roll drying, extrusion, high temperature heating in alcohol/water systems and spray cooking/drying. The physical properties of the pregelatinised starches, in particular the wettability, the dispersibility and peak viscosity in cold water, are dependent on the process used to pregelatinise the starch.

Roll-dried and spray cooked/dried starches are the most widely used pregelatinised starches on the market. These starches generally have less thickening power and less gelling tendency than the corresponding granular starch when gelatinised. This loss in thickening and gelling potential is related to the partial destruction of the hydrated granular structure. Roll-dried starches typically have less thickening power compared to spray cooked/dried starches. From a thermodynamic perspective, both common processes, roll drying and spray cooking/drying, are also not very energy efficient. There is therefore a need for starches which have thickening power in cold/warm liquids, which form gels, and which can be produced via a process that is energetically more efficient compared with roll drying and spray cooking/drying techniques.

JP 61-280244 discloses the heat treatment of starch in the presence of superheated steam of temperatures between 105 and 350° C. for less than 5 minutes at gauge-pressures of less than 9 kg/cm$^2$.

WO 2009/013346 relates to a process for modifying starches comprising subjecting a non-pregelatinised starch to a superheated steam treatment.

EP-A-0032296 describes a process and an apparatus for cooking or gelatinising a material in an atomised state, so that there is obtained an easily dryable, uniform and finely-sized product. According to this document, the material which is to be cooked is injected through an atomisation aperture in a nozzle assembly to form a relatively finely-sized spray which is heated in the nozzle assembly to a temperature effective to cook or gelatinise the material in the nozzle assembly.

The process according to the present invention provides cold water-swelling, intact, high amylose starch granules with novel and superior functionalities compared to conventional pregelatinised starches.

SUMMARY OF THE INVENTION

The current invention relates to a process for manufacturing cold water-swelling starch granules wherein the starch is a high amylose starch having an amylose content greater than 35% by weight and wherein the starch granules are intact granules, retaining granular integrity, which process comprises the steps:

a) supplying an aqueous slurry of non-pregelatinised, granular, high amylose starch to a bi-fluid nozzle of a dryer, wherein the bi-fluid nozzle has an internal chamber having at least one inlet for the aqueous slurry of the non-pregelatinised, granular starch, at least one inlet for the supply of medium pressure steam having a pressure of from 50 to 250 psig and at least one outlet;

b) atomising the aqueous slurry of the non-pregelatinised, granular starch into the internal chamber of the bi-fluid nozzle;

c) injecting medium pressure steam into the internal chamber of the bi-fluid nozzle whereby the atomised aqueous slurry of the non-pregelatinised, granular starch is heated by the medium pressure steam in the internal chamber to produce a slurry of partially treated starch granules;

d) discharging the slurry of partially treated starch granules from the internal chamber through the at least one outlet into a reactor; and e) contacting the discharged slurry in the reactor with superheated steam to heat the partially treated starch granules in the discharged slurry to produce dry, particulate cold water-swelling, intact, high amylose starch granules.

The process of the invention relates to the manufacture of cold water-swelling, intact, high amylose starch granules, i.e. granular high amylose starch which is cold water-swelling when added to water.

By the term "cold water-swelling", we mean that the granular starch is able to swell, when added to cold or warm water.

By the term "intact starch granules", we mean starch that retains granular integrity.

By the term "high amylose starch", we mean starch that has a total amylose content greater than 35% by weight, preferably a total amylose content of at least 40% by weight and more preferably at least 50% by weight.

According to a particularly preferred embodiment, in step a) of the process of the present invention as defined above, the aqueous slurry of non-pregelatinised, granular, high amylose starch is supplied to a bi-fluid nozzle of a spray dryer which nozzle comprises a nozzle body, a nozzle cap and an internal chamber located between the nozzle body and the nozzle cap, wherein the nozzle body comprises at least one atomiser which is connected to the supply of the aqueous slurry of non-pregelatinised starch for atomising the aqueous slurry of starch into the internal chamber, wherein the internal chamber has at least one inlet therein connected to a supply of medium pressure steam for introducing the medium pressure steam into the internal chamber and wherein the nozzle cap comprises at least one outlet from the internal chamber.

The present invention also provides cold water-swelling, intact, high amylose starch granules having greater than 15% solubles and having, in UDMSO (9 volumes DMSO, 1 volume 6M urea) at a 1% starch concentration at 25° C., a ratio of apparent viscosity of said cold water-swelling, high amylose, granular starch to the apparent viscosity of the corresponding parent non-pregelatinised starch of lower than 1.00.

Furthermore, the invention relates to the use of the starches according to the present invention in the manufacture of food products, especially confectionery products and convenience food products.

FIGURES

FIG. 2 illustrates the cold (30 C) RVA viscosity of starches in accordance with the present invention.

FIG. 3 illustrates sequential cold (30 C)-hot (95 C)-cold (30 C) RVA viscosity of starches in accordance with the present invention.

FIGS. 4A and 4B illustrate retorting of starches in accordance with the present invention.

DETAILED DESCRIPTION OF THE INVENTION

Figure 1:
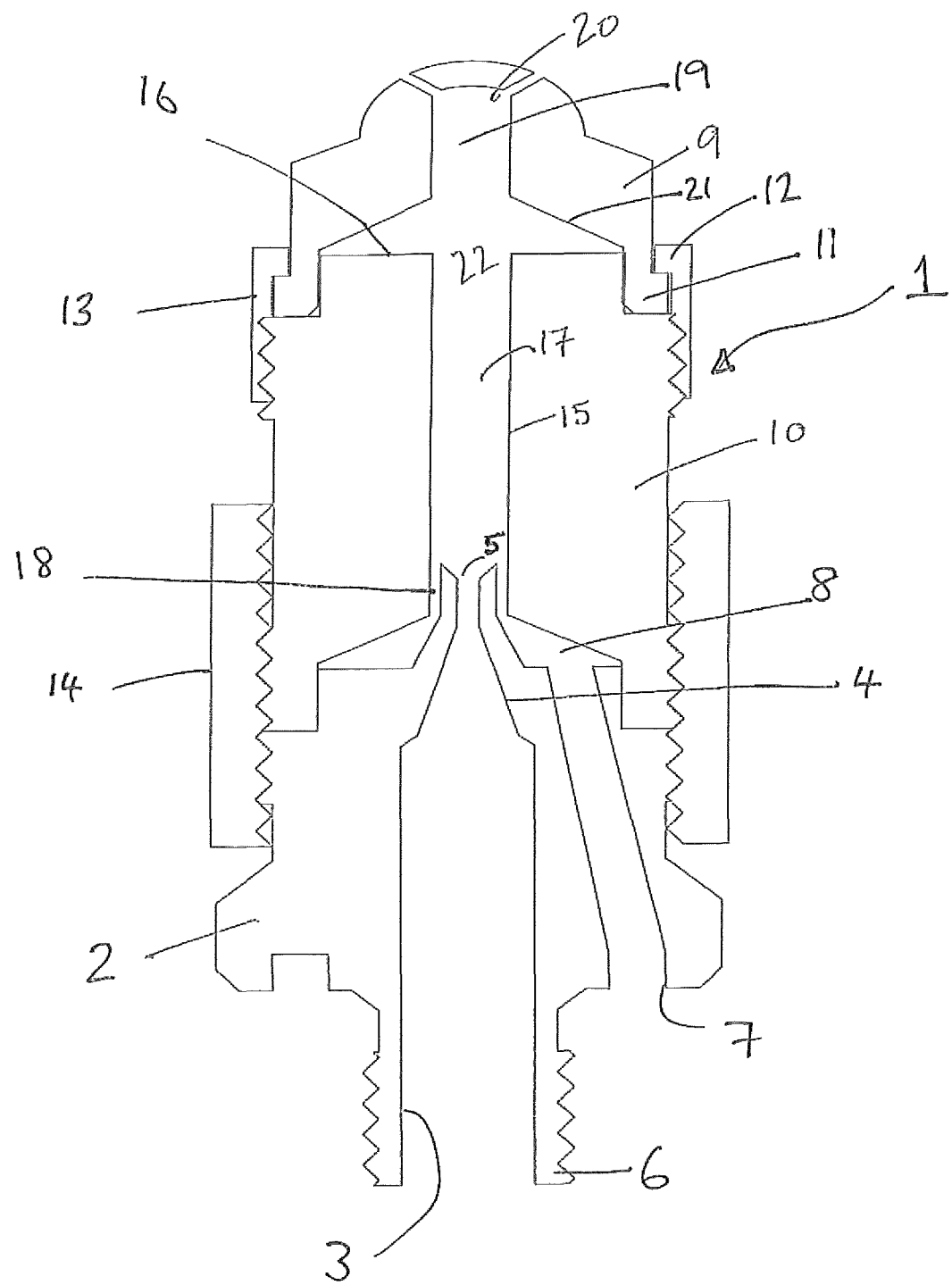
FIG. 1 illustrates an aspect of a bi-fluid nozzle in accordance with the present invention.

The term "medium pressure steam" as used herein means steam under a pressure of from 50 to 250 psig (3.5 to 17.5 barg). The units "barg" refer to bar gauge, i.e. pressure above atmospheric pressure. The term "superheated steam", as used herein, means steam (=gaseous water) heated to a temperature higher than the boiling point corresponding to its pressure. Superheated steam cannot, therefore, exist in contact with water or contain water, and it resembles a perfect gas. It is also called surcharged steam, anhydrous steam, and steam gas.

The term "internal chamber", as used herein, is the place within the nozzle where the reaction between the non-pregelatinised, granular, high amylose starch and the medium pressure steam takes place. The term "internal chamber" is not limited to a particular form of a chamber, i.e. the shape, size or configuration of the chamber. The chamber can, for example, be in the form of a tube. The "internal chamber" possesses at least one inlet for the medium pressure steam, and is vented by at least one outlet, for instance provided in or by a nozzle cap, and is provided with atomised starch slurry by at least one atomiser.

The non-pregelatinised, high amylose starches used in the process of the present invention can be derived from any native source, wherein the term "native" relates to the fact that said starch is found in nature. Unless specifically distinguished, references to starch in this description are meant to include their corresponding flours. The flours may also contain proteins, such as wheat gluten. Typical sources of the starches are cereals, tubers, root legumes, fruit starches and hybrid starches. Suitable sources include, but are not limited to, corn, pea, potato, sweet potato, sorghum, banana, barley, wheat, rice, sago, amaranth, tapioca, arrowroot and *canna*. Also suitable are starches derived from a plant obtained by breeding techniques including crossbreeding, translocation, inversion, transformation or any other method of gene or chromosome engineering to include variations thereof. In addition, starch derived from a plant grown from artificial mutations and variations of the above generic composition, which may be produced by known standard methods of mutation breeding, are also suitable herein. The starch used can be a modified starch, for instance a chemically-modified starch or a physically-modified starch. Examples of chemically-modified starches include without limitation, acetylated starches, hydroxyethylated and hydroxypropylated starches, inorganically esterified starches, cationic, anionic, oxidized starches, zwitterionic starches, starches modified by enzymes, and combinations thereof, provided that the starches are not pregelatinised and still retain granular integrity. Examples of physically-modified starches include thermally-inhibited starches such as those disclosed, for example, in EP 1038882A. It is to be understood that mixtures of any of the above mentioned non-pregelatinised starches and/or flours are also within the scope of this invention. The invention is particularly useful for the treatment of high amylose corn (i.e. maize) starches which, typically, have an amylose content of 50 to 75%. The high amylose content of such starches confers strong gelling tendencies and the unique functionalities of cold water-swelling high amylose corn starches have many potential applications for food gels and barriers, as a retorting aid, for encapsulation via molecular inclusions.

According to the process of the current invention, the non-pregelatinised, granular, high amylose starch and/or flour is treated with medium pressure steam in an internal chamber of a bi-fluid nozzle. A bi-fluid nozzle, sometimes called a two-fluid nozzle, is constituted by a liquid inlet and a gas inlet wherein the liquid and gas converge in an internal chamber before being discharged from the nozzle. In the present invention, an aqueous slurry of the non-pregelatinised starch or flour is atomised into the internal chamber of the nozzle. Medium pressure steam is also supplied into the chamber. The medium pressure steam has a pressure, typically, in the range of from 4 to 16 barg, preferably from 6 to 12 barg and more preferably from 7 to 10 barg.

Typically, the non-pregelatinised, granular, high amylose starch will be in the form of an aqueous slurry having a pH of from 2 to 11, preferably 2 to 10.5, more preferably from 2 to 10, even more preferably 2 to 9, yet more preferably from 3 to 8 and most preferably from 4 to 8.

The medium pressure steam is injected into the internal chamber and thereby displaces the air or other gas present in the internal chamber. Generally, the steam is first blown through the internal chamber until air or other gas in the chamber has been displaced from the chamber. This will be carried out before the starch slurry is introduced. It must be understood that, depending on the size and/or shape of the internal chamber, the inlet velocity of the steam injected into the chamber may be adjusted to ensure a particular desired temperature of the slurry at the outlet of the internal chamber. The starch slurry is atomised as it enters the internal chamber and the temperature of said aqueous starch slurry in the atomiser needs to be such that it is sufficiently below the gelatinisation temperature of said starch. Typically, the temperature of the slurry, at the inlet into the internal chamber of the bi-fluid nozzle, is in the range of from 30° to 75° C. The starch slurry preferably has a solids content of from 1 to 40% by weight, more preferably between 10 and 30% by weight, even more preferably of 20 to 30% by weight.

The atomised slurry of starch, in which the starch has been only partially treated in the internal chamber of the nozzle, then exits the nozzle through the outlet of the nozzle into a reactor. The slurry, entering the reactor in the form of a spray of droplets, is contacted in the reactor with superheated steam. This superheated steam treatment of the starch in the reactor has the result that the starch granules are rendered cold water-swelling while retaining granule integrity.

The reactor may be any reactor used in a drying apparatus. A drying apparatus, such as a spray dryer, typically comprises a reactor, at or near the top of which a spray of droplets is introduced and allowed to fall under the influence of gravity. The reactor used in the present invention comprises at least one inlet for the introduction into the reactor of a stream or jet of superheated steam and at least one outlet for allowing the contents of the reactor to exit. Typically, the at least one inlet for the superheated steam in the reactor is positioned such that the stream or jet of superheated steam, after entering the reactor, contacts the droplets containing the partially treated starch at or near to the outlet from the bi-fluid nozzle from which they are discharged into the reactor.

The temperature of the superheated steam entering into the reactor will, typically, be in the range of 150° to 400° C., preferably 180° to 260° C. and more preferably from 220° to 240° C.

The particles of superheated steam-treated starch are then collected at the bottom of the reactor. These particles are dried and the use of any additional drying apparatus, such as a fluid bed dryer, is entirely optional.

The inventors of the present invention have found that by treating non-pregelatinised, granular, high amylose starches according to the process of the invention, the obtained starches exhibit certain rheological and/or viscoelastic properties which are very different from those of starches obtained by prior art methods. For instance, the starches according to the present invention exhibit different properties compared to pregelatinised starches prepared by known roll drying or spray cooking/drying methods. The high amylose starches of the present invention are cold water-swelling and the granular structure is intact. These cold water-swelling, intact, high amylose starch granules have a solubles content greater than 15% and up to 35%, preferably greater than 16%. The content of soluble matter in the starch of the invention is preferably determined by a method comprising treating water in which the starch has been suspended to the action of one or more enzymes, such as one or more amylase, under conditions such that starch and/or oligosaccharides present in the filtrate are hydrolysed to produce glucose and then measuring the amount of glucose produced. More preferably, the method of determining the solubles content of the starch of the invention comprises preparing an aqueous suspension of the starch, filtering the suspension to produce a filtrate, treating the filtrate to the action of an amyloglucosidase under conditions such that saccharides present in the filtrate are hydrolysed to glucose and then measuring the amount of glucose present. Preferably, the amount of glucose produced by the action of the one or more amylase is measured using a glucose oxidase-peroxidase chromogen reagent. Methods of measuring glucose contents of fluids using the glucose oxidase-peroxidase chromogen technique are well known in the art. In this respect, reference may be made to Karkalas, "An improved enzymic method for the determination of native and modified starch", J. Sci. Food Agric. vol 36 (1985), p. 1019-1027.

The apparent viscosity of the cold water-swelling, intact, high amylose starch granules of the present invention, at a concentration of 1% in UDMSO (UDMSO is a mixture of 9 volumes of dimethyl sulphoxide (DMSO) and 1 volume of 6M aqueous urea solution), measured at 25° C., is such that the ratio of this apparent viscosity to the apparent viscosity of its parent, non-pregelatinised, granular, high amylose starch, measured under the same conditions, is lower than 1.00. By the term "parent, non-pregelatinised, granular, high amylose starch", we mean the non-pregelatinised, granular, high amylose starch from which the cold water-swelling, high amylose starch granules of the present invention are derived, for instance by the process of the present invention. A dynamic rheometer is preferably used to determine the apparent viscosities and other rheological characteristics of the UDMSO solutions of the starches. In the experiments reported herein, the dynamic rheometer used was an MCR 301 rheometer from Anton Paar Physica, Germany, equipped with a coaxial double gap measuring system. However, other dynamic rheometers available commercially from the same or other manufacturers are suitable for use in determining the apparent viscosities and other rheological characteristics of the high amylose granular starches.

Starches of the invention are suitable in many different applications in the manufacture of food products. In particular, they are useful in the manufacture of confectionery products, for instance, gum candies, and snack foods. The elevated temperatures at which the starch is treated according to the process of the present invention ensure that no microbiological contaminants survive the superheated steam treatment. Furthermore, a closed process, i.e. a process carried out in a system where the starch or flour is not exposed at any time to the environment from the superheated steam treatment to the packaging of the obtained product, ensures that the products will not be contaminated.

As stated above, the process of the present invention employs a bi-fluid nozzle such as one used in the production of spray dried starch. A suitable bi-fluid nozzle comprises a nozzle body, a nozzle cap and an internal chamber located between the nozzle body and the nozzle cap, wherein the nozzle body comprises at least one atomiser adapted to be connected to a supply of an aqueous slurry of the non-pregelatinised, granular, high amylose starch for atomising the aqueous slurry of starch into the internal chamber, wherein the internal chamber has at least one inlet therein adapted to be connected to a supply of medium pressure steam for introducing medium pressure steam into the internal chamber and wherein the nozzle cap comprises at least one outlet from the internal chamber, wherein the internal chamber also comprises a replaceable and/or interchangeable spacer element with a length of from 4 to 1000 mm, preferably from 4 to 100 mm and more preferably from 4 to 64 mm, most preferably 4 to 15 mm, enabling the length of the internal chamber to be altered. The bi-fluid nozzle has an internal chamber into which, in use, is fed medium pressure steam to establish a steam environment inside the internal chamber. An aqueous dispersion or slurry of the parent high amylose starch or flour is atomised into the steam environment inside the internal chamber. Atomization of the aqueous dispersion or slurry is carried out by one or more atomisers which are connected to a supply of the dispersion or slurry of the non-pregelatinised granular, high amylose starch or flour. The extent of the reaction that takes place between the starch and the steam in the internal chamber depends, inter alia, on the dimensions of the reaction chamber, particularly on the distance between the atomiser aperture and the one or more outlets provided in the nozzle cap from which steam and partially treated starch are discharged from the nozzle. As mentioned above, the internal chamber may comprise a replaceable and/or interchangeable spacer element with a length of from 4 to 1000 mm, preferably from 4 to 100 mm and more preferably from 4 to 64 mm, most preferably 4 to 15 mm. Such an interchangeable spacer element can be replaced by a spacer element having a different length so that the distance between the atomiser aperture and the nozzle cap vent can be altered so as to meet the desired results of the reaction between the starch and the steam. The interchangeable spacer element, therefore, makes possible a pre-selection of the results of the reaction between the starch and the steam. The interchangeable spacer element extends radially inwards into the internal chamber from the side walls of the nozzle. Since the reaction between the starch and the steam in the internal chamber is affected by the flow characteristics of the steam in the internal chamber, it is affected by the shape and/or profile of the part or parts of the spacer element which extend inwards into the internal chamber. Thus, the interchangeable spacer element can be pre-selected for use in the nozzle in order to change the flow characteristics in the internal chamber. The interchangeable spacer element may, for instance, be replaced by a different spacer element that constricts the internal chamber or one which has surfaces having configurations or conformations that alter the flow of the steam in the internal chamber, for instance to improve homogeneous distribution of the steam in the internal chamber or to reduce the possibility of heavily turbulent interactions.

The interchangeable spacer element is releasably secured to the nozzle cap and the nozzle body so that it can be replaced easily in the nozzle by an interchangeable spacer element of a different length and/or having different internal shape so as to change the size or shape of the internal chamber. Preferably, the spacer element is annular.

The body of the nozzle will be connected to a liquid feed containing the non-pregelatinised, granular, high amylose starch or flour to be subjected to the treatment with the medium pressure steam in the internal chamber. The liquid feed will typically be an aqueous dispersion or an aqueous slurry of the non-pregelatinised starch or flour and will typically be supplied under pressure, such as by means of a pump, from a holding vessel to the nozzle. The nozzle will, typically, be capable of working under pressurized conditions up to 1,100,000 Pa (11 barg). The internal chamber preferably has a circular cross section. It may be cylindrical, i.e. having a constant diameter.

If only one atomiser is provided by the nozzle body, the aperture of the atomiser is preferably located centrally on the nozzle body. If more than one atomiser is used, the atomisers should, preferably, be arranged symmetrically about the centre of the nozzle body. If only one atomiser is used, the inlet, into the internal chamber, for the medium pressure steam will preferably be located adjacent to the atomiser. If more than one atomiser is used, the one or more inlets into the internal chamber for the steam will preferably be arranged symmetrically in relation to the atomisers. In a preferred embodiment, the medium pressure steam is fed into the internal chamber from an annular inlet which surrounds the one or more atomisers.

A preferred bi-fluid nozzle which is useful in carrying out the process of the invention is described in detail below with reference to the accompanying FIG. 1.

FIG. 1 shows a cross-sectional view of a preferred bi-fluid nozzle for use in the process of the present invention. The bi-fluid nozzle 1 comprises a nozzle core 2 having a vertically-extending cylindrical bore 3 which, at its uppermost end, extends upwardly and inwardly by a frustoconical section 4 to an atomisation aperture 5. The cylindrical bore 3, at its lowermost end, has a coupling 6 provided with external threads for connection to a supply of an aqueous slurry of starch (not shown). The nozzle core is also provided with a conduit 7 for receiving a flow of medium pressure steam. The conduit 7, at its uppermost end, opens into an annular chamber 8 surrounding the atomisation aperture 5.

The nozzle 1 has a cap 9 and a replaceable annular spacer element 10. In this embodiment, the cap 9 has an external annular lip 11 which engages with a flange 12 provided on a cylindrical ring 13 having internal threads formed therein which are adapted to engage with external threads formed on the spacer element 10. By the use of the cylindrical ring 13, the cap 9 and the spacer element 10 are releasably secured together. The spacer element is secured to the nozzle body 2 by a cylindrical ring 14 having internal threads formed therein which are adapted to engage with external threads formed on the spacer element and on the nozzle body. The spacer element 10 extends radially inwards towards the aperture 5 and presents an inner surface 15 and an upper surface 16.

The inner surface 15 of the spacer element 10 defines a tubular section 17 which surrounds the atomisation aperture 5 to define an annular channel 18. The nozzle cap 9 has a cylindrical bore 19 which terminates, at its upper end, at a centrally-formed outlet 20 and which terminates, at its lower end, at an inner frustoconical surface 21 which extends downwardly and outwardly from the bore 19 terminating at its lower edge where it meets the upper surface 16 of the spacer element 10.

The enclosed space between the inner surfaces of the nozzle cap 9 and the atomisation aperture 5 forms an internal chamber 22 wherein, in use, the starch is partially treated before it leaves the nozzle via outlet 20. The extent of heating of the starch performed in the internal chamber will depend on the distance between the atomisation aperture 5 and the outlet 20 and the volume of the internal chamber. These dimensions of the internal chamber can be changed by replacing the replaceable spacer element 10 by one which has different dimensions, for instance one that defines a tubular section 17 of longer or shorter length and/or one that defines a tubular section 17 of larger or smaller diameter. The spacer element is removed from the nozzle by disengaging it from the nozzle body 2 at the cylindrical ring 14 and is removed from the cap 9 by disengaging it at the cylindrical ring 13. A spacer element having different internal dimensions can then be inserted by re-engaging it with the cap and with the nozzle body.

Thus, the length of, and/or the internal diameter of, the tubular section 17 of the spacer element 10 can be changed as required. The dimensions of the internal chamber, for instance the length of the tubular section 17 defined by the element 10 chosen will depend on the intended function of the final product obtained by the process of the invention and the desired viscosity of the starch obtained according to the process of the invention when added to cold water. The length of the tubular section, i.e. the length of the spacer element, will be in the range of from 4 to 1000 mm, preferably 4 to 100 mm, more preferably from 4 to 64 mm, most preferably 4 to 15 mm. Typically, the internal diameter of the tubular section 17 will be about 6 mm.

In use, a slurry of non-pregelatinised, granular, high amylose starch is supplied under pressure into the bore 3 of the nozzle and is atomised through the aperture 5 into the internal chamber 22 of the nozzle. Medium pressure steam is fed under pressure into conduit 7 to flow into the annular chamber 8 around the aperture 5. The steam is injected into the spray of atomised starch slurry entering the internal chamber 22 from aperture 5 and the contact of the steam with the sprayed droplets of starch slurry causes the starch in the sprayed droplets to undergo heating without disrupting the granular structure of the starch.

The sprayed droplets of partially treated starch exit from or are discharged from the internal chamber via the one or more outlets and are introduced into the reactor where they are subjected to contact with superheated steam as they fall under the influence of gravity in the reactor. The action of the superheated steam in the reactor on the only partially treated starch in the sprayed droplets introduced into the reactor is that the treatment of the starch in the droplets is completed. As the droplets of starch fall inside the reactor, the water content of the droplets is evaporated off such that the product that can be collected from the bottom of the reactor is in the form of dry, particulate starch granules having an intact granular structure.

Experiments

Aqueous slurries of high amylose starch were produced using AmyloGel 03001 (a 50% amylose corn starch from Cargill, Incorporated) or AmyloGel 03003 (a 70% amylose corn starch from Cargill, Incorporated).

The high amylose corn starch was, in each case, slurried in tap water at 10% w/w and at 18% w/w concentrations, at 40° C., and pH was adjusted up to pH 7 using a 3% NaOH solution. In each case, the slurry was pumped, via a high pressure three valve piston pump, through a heat exchanger, in order to obtain a slurry having an inlet temperature (at the inlet of a bi-fluid nozzle) of between 55° C. and 75° C. The bi-fluid nozzle used was according to FIG. 1. The nozzle included a spacer element (10) presenting an inner surface (15) to define a tubular section (17) having an internal diameter of 6 mm. The spacer element had a length of 4 mm.

Before commencing the introduction of the starch slurry into the bi-fluid nozzle, the internal chamber (22 in FIG. 1) in the nozzle was supplied with a continuous flow of medium pressure steam to flush the air from the system. The starch slurry was pumped into the nozzle at a flow feed of 26 l/hr or 25 l/hr, as shown in Table 1.

The medium pressure steam was supplied into the nozzle under a pressure of 7.0 or 9.7, as shown in Table 1. The aqueous slurry of starch was atomized into the internal chamber of the bi-fluid nozzle and the atomized starch contacted by the medium pressure steam injected into the internal chamber.

After passing through the internal chamber, the slurry was then discharged into the spray dryer reactor via the outlet in the nozzle and was then subjected to superheated steam treatment in the reactor. The temperature of the superheated steam at the inlet into the reactor was 234° C. or 230° C., as shown in Table 1 and the outlet temperature of the superheated steam leaving the reactor was 140° C. The dried, superheated steam-treated starch obtained was collected.

TABLE 1

| Trials | SHS 169 | SHS 170 | SHS 171 |
|---|---|---|---|
| Starch slurry | | | |
| base material | AmyloGel 03001 | | AmyloGel 03003 |
| starch/slurry dry substance (w/w %) | 18 | 10 | 10 |
| flow feed (l/hr) | 26 | 25 | 25 |
| slurry inlet temperature (° C.) | 55 | 69 | 75 |

TABLE 1-continued

| Trials | SHS 169 | SHS 170 | SHS 171 |
|---|---|---|---|
| Steam data | | | |
| MPS nozzle (barg) | 7.0 | 9.7 | 9.7 |
| Superheated steam (inlet into reactor) | | | |
| kg/hr | 387 | 387 | 386 |
| $m^3$/hr | 750 | 750 | 750 |
| ° C. | 234 | 230 | 230 |
| Superheated steam (outlet from reactor) | | | |
| ° C. | 140 | 140 | 140 |

The solution properties, paste properties and gelation properties of products SHS 169, SHS 170 and SHS 171, obtained according to the methods described above, were examined according to the following procedures I, II and III.

I. Solution Properties (A) Double-Gap Rheometry (MCR301)

The starches were dissolved in UDMSO (9 volumes DMSO and 1 volume 6M urea) for 24 hours at room temperature (1 g anhydrous starch made up to 100 mL with UDMSO).

The apparent viscosities of the solutions were measured on a MCR301 rheometer from Anton Paar Physica, Germany, equipped with a coaxial cylinder double gap measuring system (DG 26.7) and a Peltier temperature device (H-PTD200). The viscosity measurements as a function of shear rate ($s^{-1}$) were carried out at 25° C. according to the following procedure.

First interval of 5 minutes: non-recording

Second interval of 1,650 seconds (27.5 minutes): recording of data points:

30 measuring points with variable integration time (100 to 10 s log)

shear rate 1 to 100 $s^{-1}$ (B) Ubbelohde Capillary Flow Time

The starches were dissolved in UDMSO (9 volumes DMSO and 1 volume 6M urea) for 24 hours at room temperature (300 mg anhydrous starch made up to 100 mL with UDMSO).

The flow time, kinematic viscosity, dynamic viscosity, relative viscosity, specific viscosity and reduced viscosity were measured with the Ubbelohde capillary (Schott-Geráte) Typ-Nr. 532 11/Ia App.-Nr 106666 (K=0.0492 $mm^2$/s).

The capillary was cleaned with 15% $H_2O_2$ and 15% HCl prior copious solvent rinse.

The solutions were not filtered. Equilibration time at 20.00° C. was 15 minutes prior triplicate measurement.

The density (for the calculation of the dynamic viscosity from the kinematic viscosity) was measured at 20.00° C. with a DMA 4500 density meter from Anton Paar GmbH (Graz, Austria). Air bubbles-free ~5 mL aliquots (at room temperature) in disposable syringes were filled into the oscillating U-tube. Measurements were performed in duplicate. Calibration was made with ultrapure water (AP serial no 681) of density of 0.99820 g/$cm^3$ at 20.00° C.

(C) Amylose Quantification

The starches were dissolved in UDMSO (9 volumes DMSO and 1 volume 6M urea) for 24 hours at room temperature (300 mg anhydrous starch made up to 100 mL with UDMSO).

The apparent and total amylose is determined by the method of Morrison and Laignelet (1983). An improved colorimetric procedure for determining apparent and total amylose in cereal starches. *Journal of Cereal Science* 1 9-20.

The blue value amylose is measured with a double beam Perkin-Elmer Lambda 650 spectrophotometer (0.1 nm bandwidth) using 10.00 mm quartz cuvettes (Suprasil®) Hellma 100-QS).

Spectrophotometric accuracy was checked with acidified potassium dichromate. Wavelength and spectral resolution were checked with holmium oxide filter.

Stray light was checked with low bromide KCl solution.
Solution Properties Results and Discussion The results are below in Table 2.

TABLE 2

|  | Amylogel 03001 | SHS 169 | SHS 170 | Amylogel 03003 | SHS 171 |
|---|---|---|---|---|---|
| MCR 301 rheology, 1% starch concentration, 25° C. | | | | | |
| Viscosity at 100 s$^{-1}$ (mPa.s) | 7.27 | 6.92 | 6.10 | 6.96 | 6.38 |
| Normalised viscosity at 100 s$^{-1}$ (—) | — | 0.95 | 0.84 | — | 0.92 |
| Ubbelohde capillary flow time, 0.3% starch concentration, 20° C. | | | | | |
| Reduced viscosity (mL/g) | 118 | 108 | 95 | 108 | 97 |
| Normalised reduced viscosity (—) | — | 0.91 | 0.80 | — | 0.90 |
| Amylose content | | | | | |
| Apparent amylose (%) | 51.6 (±0.3) | 45.2 (±0.1) | 48.8 (±0.2) | 59.5 (±0.4) | 57.9 (±0.4) |
| Total amylose (%) | 58.8 (±0.2) | 49.8 (±0.1) | 52.7 (±1.1) | 66.4 (±0.1) | 63.1 (±03) |
| Δ amylose (%) | 7.2 (±0.5) | 4.6 (±0.0) | 3.8 (±0.8) | 6.9 (±0.2) | 5.1 (±0.6) |

II. Paste Properties
(A) Extent of Solubles, i.e. α-Glucan Extractables at 30° C.

4.5 g of starch (anhydrous basis) is weighed in a 600 ml beaker and wetted with 50 g ethylene glycol. 400 g buffer solution (0.02 M acetate buffer, pH 5.5) was added to the starch and the whole was mixed thoroughly with a large spoon for 1 minute. The paste was then stirred (magnetic stirring, 200 min$^{-1}$) for 30 minutes at 30° C.

The extent of starch solubles was measured from the filtrate (through 0.45 μm) of the supernatant of the starch suspension (after centrifugation at 3,000 g for 10 minutes). The filtrate is hydrolysed with amyloglucosidase and the resulting glucose quantified with glucose oxidase-peroxidase-chromogen as described by Karkalas (1985). An Improved Enzymic Method for the Determination of Native and Modified Starch. *J. Sci. Food Agric.* vol. 36 p. 1019-1027.

All data reported at 30° C. in 0.02M acetate buffer pH 5.5

|  | Amylogel 03001 | SHS 169 | SHS 170 | Amylogel 03003 | SHS 171 |
|---|---|---|---|---|---|
| Solubles at 30° C. | | 34.1 | 25.0 | | 16.6 |

(B) RVA Pasting

The cold (30° C.) RVA of 5.9% starch paste (1.76 g starch dry basis, 3.43 g ethylene glycol, 24.81 g demi-water) was performed at 105 rpm.

The initial cold paste viscosity is in the decreasing order: SHS 169>SHS 170>SHS 171.

The results are shown in FIG. 2. In this Figure, the SHS 169, SHS 170 and SHS 171 starches of the invention are shown as T169, T170 and T171, respectively.

The sequential cold (30° C.)-hot (95° C.)-cold (30° C.) RVA of 15% starch paste (4.5 g starch dry basis, 8.77 g ethylene glycol, 16.73 g demi-water) was performed at 105 rpm. The initial cold paste viscosity is in the decreasing order: SHS 169>SHS 170>SHS 171.

The final cold paste viscosity is in the decreasing order: SHS 171>SHS 169>SHS 170. The results are shown in FIG. 3.

The higher set-back of the SHS with highest amylose content is attributed to amylose gelation as discussed in Section III below.

(C) High Pressure MCR300 Starch Cell Pasting

The retorting of 6% starch paste (14.5 g starch dry basis, 25 g ethylene glycol, 200 g 0.02M acetate buffer pH 5.5) was performed at 160 rpm, up to 121° C. under 6 bars with the high pressure ST24/Pr of the MCR300 rheometer.

It is clear that the very low viscosity of the SHS (compared to the cook-up parent starch) could be used for improved heat transfer applications prior gel setting.

The results obtained for the starches of the invention SHS 169 and SHS 170 and for the parent, non-pregelatinised, starch AmyloGel 03001 are shown in FIG. 4A. The results obtained for the starch of the invention SHS 171 and for the parent starch AmyloGel 03003 are shown in FIG. 4B.

III. Gelation Properties

The experiments were carried out using an MCR 300 rheometer from Anton Paar Physica, Germany, equipped with a cylinder measuring system called a starch cell and a shaft ST24 (also from Anton Paar Physica). The starch pastes tested were prepared from the samples SHS 169 and SHS 171 above by weighing an amount of starch (to give a final starch concentration in the paste of 2%, 4%, 6% and 8%), wetting the starch with ethylene glycol and then adding 0.02M acetate buffer, pH 5.5, to the starch followed by mixing the starch/ethylene glycol/buffer mixture thoroughly for 1 minute. The compositions of the pastes prepared are shown in the Table below.

TABLE

| Starch concentration (wt %) | Ethylene Glycol (wt %) | 0.02M acetate buffer pH 5.5 (wt %) |
|---|---|---|
| 2 | 11 | 89 |
| 4 | 11 | 89 |

TABLE-continued

| Starch concentration (wt %) | Ethylene Glycol (wt %) | 0.02M acetate buffer pH 5.5 (wt %) |
|---|---|---|
| 6 | 22 | 78 |
| 8 | 22 | 78 |

The gel strengths were measured after cooling down to 25° C. (at a cooling rate of 1° C./minute). Gel strengths of compositions cooled to 25° C., at a cooling rate of 0.3° C./minute were also measured. The measurements were made by oscillation test in the linear visco-elastic range (2% strain; 1 Hz frequency). The gel strength could not be measured for the 2% and 4% starch pastes due to a torque below the instrument resolution. The storage modulus G' (Pa) at 25° C. measured for the 6% and 8% starch pastes are shown in the Table below.

TABLE

| Gelation conditions | G' (Pa) at 25° C. | |
|---|---|---|
| | SHS 169 | SHS 171 |
| 6% starch, cooled at 1° C./min | 4.4 | 30.9 |
| 8% starch, cooled at 1° C./min | 9.0 | 82.5 |
| 6% starch, cooled at 0.3° C./min | — | 441 |

According to the results shown in the Table above, gel strength increases with increasing amylose content and gel strength increases with decreasing cooling rate.

CONCLUSIONS

The high amylose starches, produced according to the invention, are pregelatinised starches as evidenced by cold (30° C.) paste viscosity (by RVA).

The instant, high amylose starches of the invention, according to the results reported above, have potential applications:

(i) for amylose-induced gelation (e.g. in confectionery, such as wine gums);

(ii) for improved heat transfer due to their very low viscosity at retort temperatures, prior to gel setting; and (iii) for encapsulation (molecular inclusion) through retrogradation as single helices with the ligand in the hydrophobic region of the helix.

What is claimed is:

1. Cold water-swelling, high amylose starch granules, said starch retaining its granular integrity, said starch having greater than 15% solubles and having in UDMSO (9 volumes DMSO and 1 volume 6M urea) at 1% starch concentration at 25° C. a ratio of apparent viscosity of said cold water-swelling, intact, high amylose starch granules to the apparent viscosity of the parent non-pregelatinised, granular, high amylose starch of lower than 1.00, wherein said starch has an amylose content greater than 35% by weight.

2. Cold water-swelling starch granules according to claim 1, which have greater than 16% solubles.

3. Cold water-swelling starch granules according to claim 1, having a total amylose content of at least 40% by weight.

4. Cold water-swelling starch granules according to claim 3, having a total amylose content of at least 45% by weight.

5. A confectionery product containing confectionery ingredients and starch, wherein the starch is derived from the cold water-swelling, intact, high amylose starch granules claimed in claim 1.

* * * * *